Patented Aug. 11, 1925.

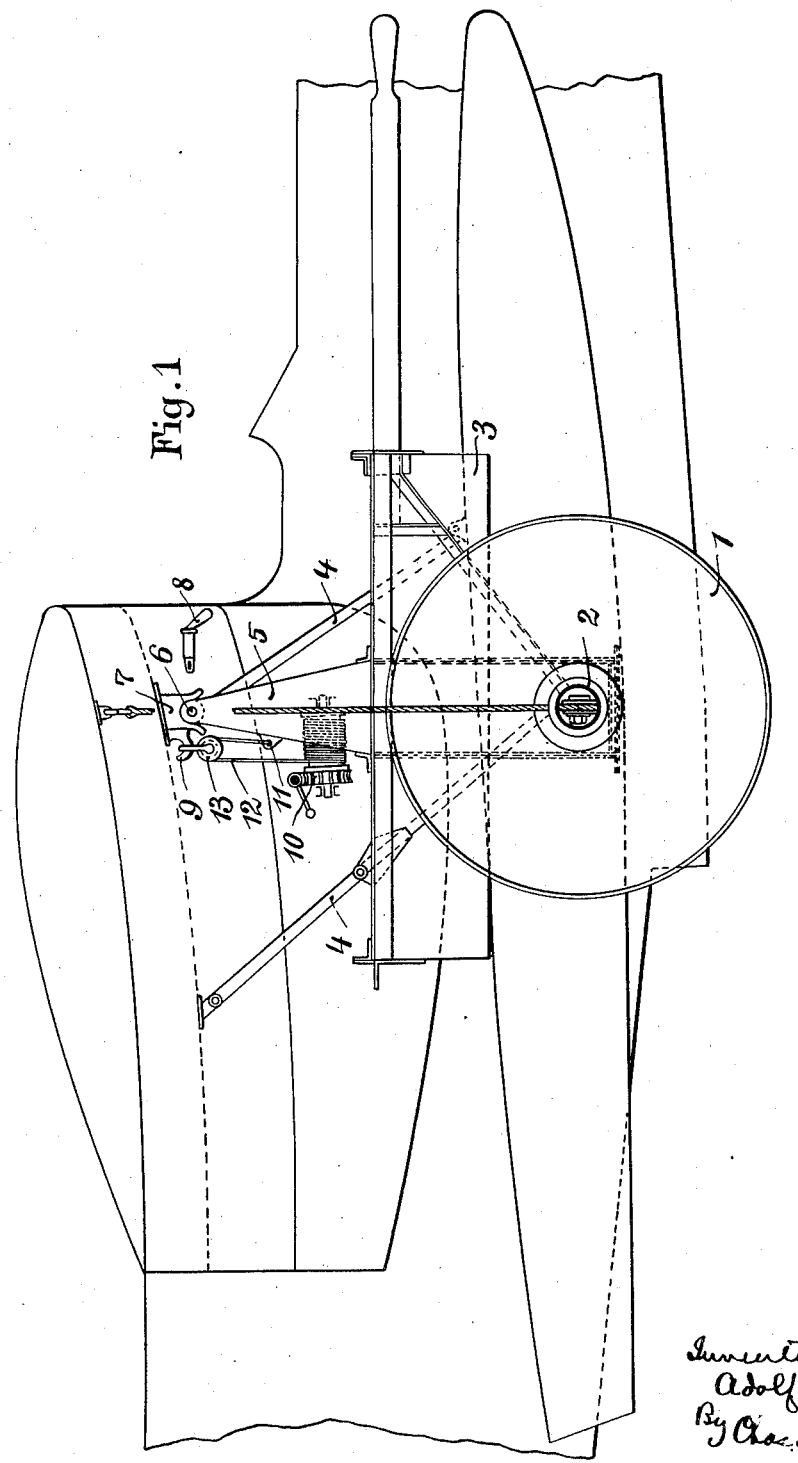

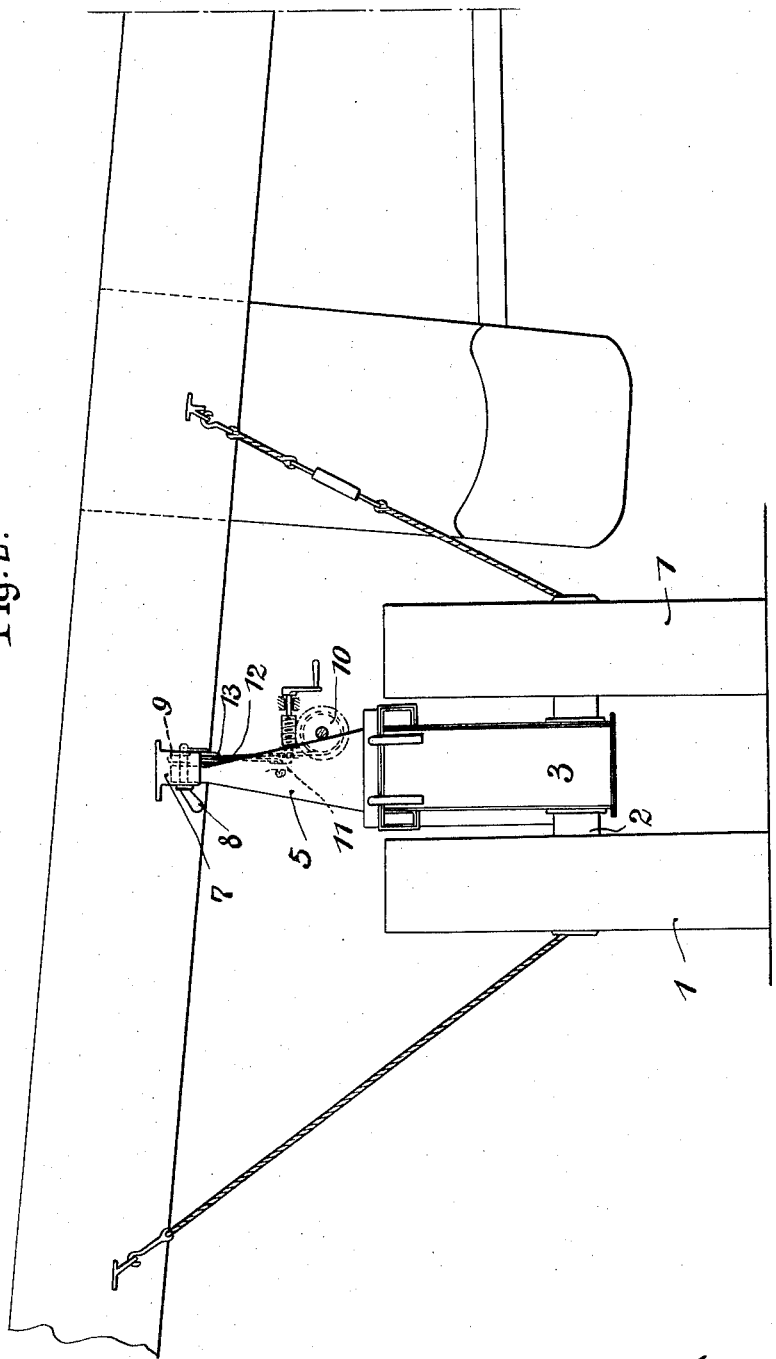

1,549,688

UNITED STATES PATENT OFFICE.

ADOLF ROHRBACH, OF BERLIN-WILMERSDORF, GERMANY.

FLOATING TROLLEY FOR SEAPLANES.

Application filed June 10, 1924. Serial No. 719,104.

*To all whom it may concern:*

Be it known that I, ADOLF ROHRBACH, a citizen of the German Empire, Ruhrstrasse 12, Berlin-Wilmersdorf, Germany, have invented Floating Trolleys for Seaplanes, of which the following is a specification.

Floating trolleys for the bringing-in or taking ashore of seaplanes, are generally known. These floating trolleys are fixed to suitable parts of the craft while the seaplane is on, or in the water. In spite of the employment of box-like watertight compartments, or other means, keeping the trolleys afloat, the attachment of such trolley devices is extremely difficult at a rough sea or strong gale, owing to the fact that the movements of seaplane and trolley are very seldom parallel, but during most of the time contrary to each other. Frequently it also happens that seaplane and trolley collide with each other violently causing considerable damage.

These difficulties make themselves particularly felt whenever large seaplanes are to be taken ashore. The craft itself as well as the beach axle or trolley device has such an amount of inertia of the masses that it becomes an impossibility for the crew to avoid collisions, and a correct fitting of the trolley is, therefore, very uncertain.

The invention, described herein, eliminates all these difficulties in the following manner: The trolley itself, floating deep in the water, is attached to the seaplane by a rope fastened to an appropriate place of the craft. By means of a crane or pulley arrangement the trolley is then fetched up to the fitting-place and hoisted. Since the trolley is floating extremely deep in the water, the possibility of a damage is almost entirely excluded even in a particularly rough sea; for as soon as the trolley is hoisted just a little, it follows the movements of the floating aircraft, thus facilitating the final fastening.

It is especially advantageous not to fit the wheels directly to watertight parts of the seaplane, like boat, or float, but rather to wing or float frame, because thus any risk of leakiness which may be produced by shocks upon being wheeled over the ground, will be effectually avoided.

Some embodiments of my invention are shown, by way of example, on the accompanying drawings, wherein:

Fig. 1 shows in side elevation a beach trolley for seaplanes.

Fig. 2 is a front view of the trolley.

The trolley consists of one or more wheels, attached to a shaft 2, and fitted to a floating body 3. The floating body 3 carries the connecting struts 4 and the turret 5. The top part 6 of the turret is so constructed that it catches into the funnel-like fitting 7 of the wing where it can be secured by a locking bolt. The wing fitting 7 is provided with a hook 9, whilst the turret 5 is fitted with a crane, pulley arrangement, or the like, 10, one end of which 11, is fastened to the turret, and the other end fixed to the block of the pulley arrangement. The rope 12 runs over a sheave 13, which can be hung to the hook 9. The use of this device is very simple. After the trolley—by means of a rope—has been brought up to the seaplane close enough, the sheave 13 is hung into the hook 9 and the trolley raised to wing or float frame, until the apertures for the locking bolt exactly cover each other so that this bolt can be easily inserted. The struts 4 are then locked by bolts.

I claim:

1. A floating trolley for seaplane adapted to be hauled to a point underneath the same and having thereon a support for attachment to the plane and power means carried thereby and adapted to be connected with the craft in a manner to elevate the trolley and its support above its normal floating position into fastening engagement with the craft.

2. An apparatus of the character set forth including a floating trolley adapted to be hauled to points underneath seaplanes and to be attached thereto for beaching the same, said floating trolley in its normal floating position stopping short of the co-operating attaching parts on the seaplanes, and a power means adapted to elevate the floating trolley from its normal floating level to attaching relation with the planes.

3. The combination of a seaplane having an attachable fitting part carried thereby, with a floating trolley adapted to be transported to a point underneath said fitting part and having a support normally stopping short of said fitting part and power means carried by the trolley and having a connection with said fitting part to elevate the floating trolley above its normal floating position into attachable relation with said fitting part.

4. The combination of a seaplane having an attaching part fitting secured at a point thereunder, with a floating trolley adapted to be transported to a floating position in the neighborhood of said attaching part and having a supporting part normally stopping short of said attaching part in the normal floating position and a hand power means disposed between said floating trolley and the craft for elevating the trolley above its floating level into attachable relation with the craft.

5. A craft of the character set forth in claim 4 having strut or bracing members disposed between the seaplane and the floating trolley and adapted to be readily locked in operative position after the elevation of the floating trolley above its normal floating position.

6. A structure of the character set forth in claim 4 wherein the power means is in the form of a windlass carried by the floating trolley and including a pulley attached to the craft fitting part.

7. A floating trolley for seaplanes whose upper supporting structure in the normal floating position of the trolley stops short of that part of the craft to which it is to be attached, and hand power means carried by the trolley, together with readily attachable operative connections between the power means and the craft for elevating the floating trolley above its normal floating level to attachable relation with the craft.

8. The combination of a seaplane and a float therefor with a floatable trolley attached to the craft to one side of the float, said floatable trolley in the normal floating position of the craft being disposed above its own floating level, together with hand operated means for releasing the floating trolley and permitting it to descend after detachment from the craft to its own floating level free from colliding relation therewith.

Dated this 23rd day of May, 1924.

In testimony whereof, I have signed my name to this specification.

ADOLF ROHRBACH.